United States Patent [19]
Browning et al.

[11] 3,928,211
[45] Dec. 23, 1975

[54] PROCESS FOR SCAVENGING HYDROGEN SULFIDE IN AQUEOUS DRILLING FLUIDS AND METHOD OF PREVENTING METALLIC CORROSION OF SUBTERRANEAN WELL DRILLING APPARATUSES

[75] Inventors: William C. Browning; Homer F. Young, both of Harris County, Tex.

[73] Assignee: Milchem Incorporated, Houston, Tex.

[22] Filed: Dec. 30, 1974

[21] Appl. No.: 537,243

Related U.S. Application Data

[63] Continuation of Ser. No. 82,866, Oct. 21, 1970, abandoned.

[52] U.S. Cl............. 252/8.5 B; 166/244 C; 175/64; 252/8.5 A; 252/8.55 E; 252/387
[51] Int. Cl.$^2$........................................... C09K 7/04
[58] Field of Search......... 252/8.5 A, 8.5 B, 8.55 E, 252/387; 175/64; 166/244 C

[56] References Cited
UNITED STATES PATENTS

| | | | |
|---|---|---|---|
| 2,019,468 | 10/1935 | Bacon............................ | 423/571 X |
| 2,073,413 | 3/1937 | Cross et al....................... | 252/8.5 |
| 2,429,593 | 10/1947 | Case................................ | 252/8.55 |
| 2,605,221 | 7/1952 | Hoeppel.......................... | 252/8.5 |
| 2,956,861 | 10/1960 | Garlet............................. | 423/266 |
| 3,301,323 | 1/1967 | Parsons........................... | 175/24 |
| 3,506,572 | 4/1970 | Van Dyke et al................ | 252/8.5 |

FOREIGN PATENTS OR APPLICATIONS

| | | |
|---|---|---|
| 869,131 | 5/1961 | United Kingdom |

OTHER PUBLICATIONS

Sheppard, Pipe Line Corrosion, Article in World Oil, June, 1949, pp. 193, 194, 198 and 202.

*Primary Examiner*—Herbert B. Guynn
*Attorney, Agent, or Firm*—William C. Norvell, Jr.

[57] ABSTRACT

This invention relates to a process for scavenging hydrogen sulfide which frequently contaminates aqueous drilling fluids and to a method of preventing metallic corrosion of iron drill pipe and the like by utilizing metal compounds which form insoluble sulfide compositions in aqueous media, said compounds containing metals having an electromotive activity greater than that of iron. Said process consists of introducing said compounds into an aqueous drilling fluid and circulating said fluid in the well bore. The metal compounds may be prepared for subsequent addition to the drilling fluid or may be obtained by in situ reactions of materials and/or drilling fluid constituents. A preferred process utilizes metal compounds selected from the class consisting of zinc carbonate, basic zinc carbonate, and zinc hydroxide. An alternate preferred process utilizes a zinc compound which is reacted with an organic material to provide dispersion of the zinc compound, thus enhancing sulfide scavenging characteristics. The metal compounds utilized in the present invention will not adversely affect vital drilling fluid properties.

4 Claims, No Drawings

PROCESS FOR SCAVENGING HYDROGEN SULFIDE IN AQUEOUS DRILLING FLUIDS AND METHOD OF PREVENTING METALLIC CORROSION OF SUBTERRANEAN WELL DRILLING APPARATUSES

CROSS REFERENCE TO RELATED APPLICATION

This is a Continuation of application Ser. No. 82,866, filed Oct. 21, 1970, now abandoned.

BACKGROUND OF THE INVENTION

1. Field of the Invention

The present invention relates to a process for scavenging hydrogen sulfide in aqueous drilling fluids and to a method of preventing hydrogen sulfide corrosion of metallic surfaces of drilling apparatuses utilized in all phases of drilling, completing and workover of subterranean wells. A preferred process utilizes zinc compounds selected from the class consisting of zinc carbonate, basic zinc carbonate, and zinc hydroxide. Another preferred process incorporates a zinc compound in an organic dispersant. The use of these zinc compounds is particularly useful because zinc ions will not be pulled out of solution by iron surfaces to "plate out." This is a particular advantage over copper compounds which are currently used by those skilled in the drilling fluid art for the removal of hydrogen sulfide found in aqueous drilling fluids. In addition, the use of the present metallic compounds have been found to not adversely affect drilling fluid properties, such as viscosity, filter loss, etc.

2. Description of the Prior Art

When drilling subterranean wells in order to tap deposits of oil or gas, and in particular when utilizing a rotary drilling method comprising a bit to which is attached a drill stem, a drilling fluid or "mud", as it is commonly referred to by those skilled in the art, is circulated to the bottom of the borehole, ejected through small openings in the drill bit at the bottom of the hole, and then returned to the surface through the annular space between the drill stem and the wall of the borehole where it may be mechanically and/or chemically treated and recirculated. When casing has been inserted into the hole, the fluid will circulate between the drill stem and the internal wall of the casing. Reverse circulation, in which the drilling fluid is injected into the hole through the annular space and returned to the surface by means of the drill stem is sometimes utilized.

Drilling fluids serve multi-functions and must have a variety of properties. For example, a drilling fluid for utilization as discussed above, must be a liquid of such viscosity that it may serve as an effective transporter of cuttings from the borehole to the surface for removal. A drilling fluid must also prevent excessive amounts of fluid from flowing from the borehole into surrounding formations by depositing on the wall of the hole a thin but substantially impervious filter cake. In addition, a drilling fluid must also be able to hold solids in suspension, preventing their return into the bit area when the drilling rate is reduced or the drilling temporarily terminated. This property is obtained by utilizing additives which will give to the drilling fluid a gel structure at increased viscosities. A drilling fluid must also serve as a weighting agent, exerting pressure on the surrounding formations, thus preventing possible caving of the borehole by highly pressurized oil or gas in the formation.

Finally, a drilling fluid must also serve as a lubricating agent for the bearings utilized in the drill bit and on the surface of the bit teeth. This is especially true when aqueous drilling fluids are utilized. This lubrication characteristic of a drilling fluid will reduce friction on the drilling apparatus and thus reduce drilling costs.

Aqueous, or water base, drilling fluids are composed of a water base, which may be a brine, seawater, or fresh water. It is possible in many instances to use water alone as a complete drilling fluid. In recent years polymer drilling fluids, which are thixotropic, shear-thinning systems have been utilized. These systems do not rely on the incorporation of clayey solids and do not require the addition of dispersants, such as quebracho or lignosulfonates. These systems may utilize a biopolymer, for example, the polysaccharide gum produced by the action of bacteria of the species Xanthomonas. Such a material is readily available as "Kelzan XC" manufactured by Kelco Corporation, San Diego, California.

To the aqueous system may be added finely divided colloidal materials, such as clays and clayey materials, and weighting agents such as barite and the like. These aqueous drilling fluids are useful in the drilling, completion, reduction and/or workover, including secondary recovery operations, of oil and gas wells and the like. This should be understood even through such fluids may be referred to herein as "drilling fluids" or "drilling muds."

Although water base drilling systems have been utilized by the drilling industry for many years, they nevertheless have been found to have some particular disadvantages, not the least of which is their potential corrosivity. The corrosivity of these systems is due to the presence of water, oxygen, and hydrogen sulfide. This is especially true when the water base is a brine. Oxygen is inadvertently incorporated in the system at the bell nipple, where air is sucked into the mud, across the shaleshaker, and through mixing action in the mud pit, increasing oxygen corrosion of metal surfaces in the well.

Hydrogen sulfide, an undesirable but often encountered compound, is probably the most harmful corrosive compound found in drilling fluid systems. Hydrogen sulfide may appear in a drilling fluid as a result of encountering a strata or permeable formation containing this gas. In many instances, underground waters will contain contaminating quantities of hydrogen sulfide. In addition, sulfate-reducing bacteria will transpose sulfates into hydrogen sulfide. When gases flow to the hole from the formation they will cause a "cutting" of the drilling mud weight, thus resulting in a "kick." When using alkaline drilling fluids at a pH of about 11 or less, it often occurs that hydrogen sulfide gas will dissolve in the fluid, reducing its pH and thus making it more corrosive. In addition to being a corrosive material, hydrogen sulfide gas will sometimes affect the viscosity, fluid loss and other properties of the drilling fluid.

In the presence of moisture, hydrogen sulfide gas will attack steel to form ferrous sulfide and free hydrogen. The free hydrogen may penetrate into the metal, i.e., steel tubular materials, causing hydrogen embrittlement. Hydrogen sulfide attacks on metal surfaces may create pitting which will augment stress corrosion and/or hydrogen stress cracking. Brittle fractures have occurred with very little hydrogen sulfide present in the system.

In the economical recovery of hydrocarbon liquids in subterranean wells, it will sometimes be necessary to initiate secondary recovery methods, such as water flooding. Many times hydrogen sulfide-contaminated water will be the only available source of injection water. The use of this water will result in a health hazard to personnel and may also contribute to corrosion of metal surfaces of water pumps and the like.

In addition to the above discussed problems of hydrogen sulfide contamination, it is particularly important to note that the presence of hydrogen sulfide is extremely hazardous to the health of personnel working near a drilling rig. When a drilling fluid is discharged into the pit, hydrogen sulfide will escape as a high density gas, which, being heavier than air, will collect in low or entrapping areas. Although somewhat easy to detect by smell, increased concentrations paralyze olfactory nerves so that detection after long periods of exposure becomes almost impossible.

The potential for corrosion is somewhat reduced in these drilling fluid systems through the addition of colloidal materials, such as bentonite, drill solids, etc. In addition, chemical treatment of the system for filtration control, borehole stabilization, etc., with lignites, lignosulfonates, and similar additives will also aid in reducing corrosivity. These drilling fluids are maintained at alkaline pH, thus reducing the corrosiveness of acidic gases such as hydrogen sulfide.

Many processes and compositions have been discussed in the prior art for the removal of hydrogen sulfide from aqueous drilling fluids prior to injection and during circulation in a subterranean well. However, these processes and compositions have been somewhat unsatisfactory for a variety of reasons. For example, a process utilized in the prior art to remove hydrogen sulfide is that of "submerged combustion." This process concerns the burning of methane gas in an aqueous environment to liberate hydrogen sulfide from the system. Although somewhat effective in removing hydrogen sulfide, this procedure has been found to be undesirable and to be limited mainly to aqueous systems containing water as the sole drilling fluid constituent. The burning of methane gas requires expensive surface burner apparatuses. In addition, methane gas as a raw material for combustion is relatively expensive, and in many areas, is difficult to obtain and store.

Another method which has been discussed in the prior art is the treatment of aqueous systems with sulfur trioxide and a hydrogen sulfide-absorbing gas, preferably a hydrocarbon gas, hydrogen, or carbon dioxide, in an oxygen free environment. The sulfur trioxide will react with water to yield sulfuric acid and thus lower the pH of the system. This reduction in pH allows easier removal of hydrogen sulfide by the absorbing gas. Hydrogen sulfide is then removed from the absorbing gas by utilizing a variety of methods and converted into sulfur trioxide for reinjection into the system as a harmless chemical additive, allowing the absorbing gas to be reinjected into the system for additional removal of hydrogen sulfide. This process is somewhat expensive and, in addition, when higher pH drilling fluids are desired, this process will not be effective because additions of sulfuric acid will cause uncontrollable lowering of pH in many instances.

Another method discussed in the prior art to remove hydrogen sulfide is that of aeration and filtration of the water. However, this process is unsatisfactory because of additional corrosive tendencies caused by the oxygen which is necessarily added during the process.

Still another method utilized by those skilled in the art is oxidation-reduction of the sulfide ion in hydrogen sulfide, producing free sulfur and water. This method has been taught utilizing a variety of methods. For example, precipitation of free sulfur from hydrogen sulfide has been accomplished by means of subjecting hydrogen sulfide-contaminated fluids to treatment with sulfur dioxide gas. This procedure has been especially unsatisfactory because the sulfur is released in the form of "flowers of sulfur", a sulfur product which itself is hard to remove from aqueous systems and will adversely affect drilling fluid properties. In addition, it has been found that not all of the hydrogen sulfide in an aqueous system will react with the sulfur dioxide, thus allowing some hydrogen sulfide to remain in the system and to be recirculated into the subterranean well.

Hydrogen peroxide has also been frequently, although somewhat unsatisfactorily utilized. The reaction is as follows:

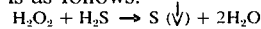

When utilized in drilling fluids, the sulfur will become a finely divided inert solid in the system. However, hydrogen peroxide can be used successfully only in limited applications in drilling fluids. As is pointed out in U.S. Pat. No. 3,506,572, "(w)hile the hydrogen peroxide solution is well adapted to treating out large quantities of hydrogen sulfide contamination, its reactive nature renders it unfit for systematic downhole treatment. After a short time in contact with the mud, it will become dissipated by reacting with other components of the drilling mud."

Precipitation methods have also been utilized. These methods have incorporated the use of copper complexes such as copper hydroxide, copper carbonate and cuprous oxide. Although these compounds have been effective in precipitating the sulfide ion, they nevertheless are unsatisfactory because metallic surfaces, i.e., the drill stem and/or casing, will pull the copper ions out of solution causing them to deposit on the metal surface. This chemical reaction is called electrodeposition. The ultimate result of electro-deposition of the copper ions on the metal surface is eventual bimetallic corrosion. This is caused by the tendency of the iron-metal to acquire electrons from ions of metals in solution which are lower in electromotive force. This factor causes the iron to pass into ionic form from the free metal. The relative ability of metallic elements to lose electrons is graphically illustrated in electromotive activity series charts which generally list the elements in order of their decreasing tendency to pass into ionic form by losing electrons. Any element in the activity series will react with ions of any element below it in the series, causing a liberation of energy. Thus, a reaction would be expected to take place if iron were placed in an aqueous solution containing ions of a metallic element the electromotive activity of which was below or less than that of iron. Such a reaction would result in free metal being deposited on the iron, and, in return, free iron ions appearing in the solution. This is an explanation of why metal complexes containing copper, a metal element below that of iron in the electromotive series, will cause iron to go into solution. This reaction is graphically illustrated by referring to the overall electrochemical cell potential of the cells,

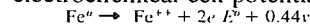                 1.

and $$Cu^{++} \rightarrow Cu^0 - 2e \quad E^0 = -0.337v \quad 2.$$

which can be calculated as follows:

$$E = E^0_{Fe, Fe^{++}} + E^0_{Cu^{++}, Cu^0}$$

The potential of the overall cell is:

$$E = +0.777$$

The free energy of the system can be expressed as:

$$F^0 = -E^0 n \, F$$
$$F^0 = -55,000 \text{ cal.}$$

This reaction therefore is spontaneous and will cause iron to reduce $Cu^{++}$ to $Cu^0$, resulting in the iron going into solution. This is further illustrated by the reaction of iron with copper carbonate, a material which has been utilized as a hydrogen sulfide scavenger in aqueous drilling fluids. The copper carbonate equilibrium in aqueous systems can be expressed as:

$$CuCO_3 \rightarrow Cu^{++} + CO_3^=$$

The copper concentration in equilibrium with solid $CuCO_3$ is $1.6 \times 10^{-5}$ moles per liter, which is a minute quantity of copper ion. Nevertheless, as one copper ion is removed from solution by being reduced to copper metal, another copper ion will go into solution from the solid $CuCO_3$ present. This reaction process will continue as long as solid $CuCO_3$ and iron are in this same aqueous system. The ultimate result of electrodeposition of the ionic copper on the metal surface is eventual metallic corrosion, i.e., the more copper metal that is deposited on the surface, the less iron that will be present.

Metal containing materials have been taught by the prior art for a variety of uses in drilling fluids. For example, Hoeppel, U.S. Pat. No. 2,605,221, teaches the use of heavy metal flocculating compounds with deflocculating peptizing compounds to reduce the consistency of the drilling fluid. These materials are used together synergistically to reduce the viscosity and gel strength of a drilling fluid. This teaching must, of necessity, utilize soluble metallic compounds as a prerequisite for reaction with clay surfaces. As stated earlier, our processes utilize metallic compounds which are insoluble, thus incapable of reacting with colloidal surfaces such as clay and the like. Johnson et. al., U.S. Pat. No. 3,307,625 teaches the use of an alkali metal hydroxide selected from the class consisting of sodium, potassium, and lithium to neutralize the drilling fluid to a pH of about 7 in order to somewhat treat hydrogen sulfide. At this pH, the sulfide ion will react with elemental iron in the drilling apparatus, i.e., drill stem, casing, etc., to form a coating of ferrous sulfide which acts as a "barrier" to corrosive agents in the drilling fluid. This material causes an increase in pH up to about 9 to 10 due to the formation of ionized sulfide salts. An alkali metal sulfide, such as sodium sulfide, must be added to the drilling fluid for further protection after pH 9 or 10 is obtained. These additives have not been satisfactory because of the presence of sodium sulfide, itself a health hazard to those personnel working around the drilling rig causing softening and irritation of the skin. In addition to this hazard, the addition of this chemical is costly, adding unnecessarily to the total drilling costs. It is also important to note that this process requires constant monitoring of pH. This method protects against hydrogen sulfide corrosion by forming a protective coating on the drill stem, etc. surfaces, rather than removing the hydrogen sulfide from the system.

Water soluble metallic salts have been utilized as hydrogen sulfide scavengers in oil pipelines transporting crude oil. For example, zinc sulfate has been found to be effective in this area. We have found that particular metal compounds may be harmlessly introduced into aqueous drilling fluids, or produced in situ in aqueous drilling fluids, to react with hydrogen sulfide in such a manner as to produce an extremely insoluble material which itself will not affect vital drilling fluid properties. The metal compounds which are utilized in the present invention are themselves insoluble in inorganic solutions, such as aqueous drilling fluid systems. In addition, we have discovered that the use of the selected metallic compounds will not cause and will prevent corrosion of metal or steel surfaces, a common occurrence when metallic salt-containing materials such as copper carbonate are utilized. Of particular importance is the discovery that the metal compounds of the present invention may be utilized in aqueous drilling fluids, including drilling fluids comprising a biopolymer additive, without adversely affecting any of the desirable drilling fluid properties. In addition, the discovery of the use of particular metallic compounds as hydrogen sulfide scavengers in aqueous drilling fluids also permits treatment of this noxious and troublesome gas in an economically feasible manner.

It is, therefore, an object of the present invention to provide a process for scavenging hydrogen sulfide in aqueous drilling fluids utilizing a material which will not cause metallic corrosion of subterranean well drilling apparatuses.

It is a further object of the present invention to provide a process for scavenging hydrogen sulfide by introducing a metallic compound into the circulating aqueous drilling fluid or producing the metallic compound in situ in the aqueous drilling fluid.

It is a further object of the present invention to provide a process which may be utilized to scavenge hydrogen sulfide in aqueous drilling fluids without adversely affecting vital drilling fluid properties.

Other objects and advantages in the use of the process of the present invention will be apparent from a reading of the disclosure, examples, and claims which follow.

DESCRIPTION OF THE PREFERRED EMBODIMENTS

The present invention consists of a process for scavenging hydrogen sulfide in aqueous drilling fluids utilized in subterranean wells and a method of preventing metallic corrosion of subterranean well drilling apparatuses. We have found that metallic compounds containing a metal higher than that of iron in electromotive activity series charts which will form an insoluble sulfide composition in aqueous media having a solubility product constant less than that of the metallic compound may be utilized to remove, or "scavenge", hydrogen sulfide without corroding metal drill pipe, and the like. By "scavenge" and "scavenging" we mean the addition or preparation of metal compounds in drilling fluids for the purpose of consuming or converting to inactive form quantities of impurities or undesired sulfide materials. By "solubility product constant" is meant the maximum product of the ionic concentrations of a difficultly soluble salt which can exist in equilibrium with the solid phase at a definite temperature, each concentration being raised to its proper power. In general, if $$A \rightleftarrows bB \times cC$$

represents the equilibrium between the molecule A and its ions B and C in a saturated solution, then the solubility product $K_{sp}$ is given by the equation:

$$K_{sp} = [B]^b \times [C]^c$$

where [B] and [C] are expressed in gram-ionic weights per liter. In the case of zinc hydroxide, for example, the product solubility constant would be $1.8 \times 10^{-14}$. The solubility product constant of the resulting zinc sulfide is $1.2 \times 10^{-23}$. Although any metal element listed above that of iron in electromotive activity series charts may be effectively utilized in our scavinging process, we prefer, for reasons of economics, availability, and convenience, to utilize compounds containing metals such as tellurium, chromium, zinc, vanadium, manganese, zirconium, titanium, and the like. Of these metals, we prefer to utilize compounds containing manganese or zinc. A preferred scavenging process utilizes a metal compound selected from the class consisting of zinc carbonate, basic zinc carbonate, and zinc hydroxide. Another preferred process incorporates zinc compounds in an organic dispersant.

Generally speaking, any amount of the metal compounds of the present invention which is sufficient to scavenge hydrogen sulfide may be utilized. In some instances a stoichiometric ratio will be sufficient. Preferably, about a 3-to-1 metallic complex-to-hydrogen sulfide equivalent ratio can be utilized for quick and more efficient scavenging. For example, zinc hydroxide may be preferably used in a chemical equivalent ratio of about 2.4-to-1, and basic zinc carbonate may be preferably utilized at about a 2.7-to-1 ratio.

Generally speaking, the metal compounds utilized in the present invention should be added to the drilling fluid in ppb (pound per barrel) levels sufficient to provide a slight excess of scavenging agent over the quantity of hydrogen sulfide present or anticipated in the drilling fluid system in order to assure complete and fast removal. This amount may be readily determined by obtaining samples of the mud in the well from time to time and checking for sulfide content by utilizing standard sulfide evaluation techniques known to the industry. Under most circumstances this amount will be in excess of about 1 ppb and will usually not exceed 5 ppb. Under some circumstances, for example, where concentrated hydrogen sulfide pockets are encountered, increased ppb levels may be necessary. These levels may be safely utilized without adversely affecting drilling fluid rheology, filter loss, or other vital properties.

Materials which will produce the metallic compounds of the present invention may also be reacted in situ in the drilling fluid to obtain an equally effective scavenging material. For example, when a zinc-containing scavenging agent is to be obtained by in situ preparation, zinc sulfate may be reacted with sodium carbonate to produce zinc carbonate and sodium sulfate. Equally effective is the in situ reaction of zinc sulfate and sodium hydroxide producing zinc hydroxide and sodium sulfate.

Because the metallic compounds utilized in the present invention are inert and are insoluble in aqueous systems, it may be practical or desirable under some circumstances to provide a material which will disperse the metallic compound, providing enhanced scavenging power. The use of an organic dispersant provides a more highly reactive particle distribution of the metallic compound, increasing the surface area of the compound and permitting the compound to be colloidally dispersed throughout the entire hydrogen sulfide-contaminated system. Examples of such dispersants are quebracho and lignosulfonates which are frequently utilized in drilling fluids as dispersants for clayey materials and other solids. The metallic compounds may be reacted with the dispersant or under some circumstances may be reacted in situ in the drilling fluid system with the dispersant. It is important to note that the use of the metallic compounds is not limited to aqueous drilling fluids requiring or containing a dispersant. These metallic compounds are equally effective in non-dispersed drilling fluids, such as the drilling fluids composed of water and a biopolymer. The metallic compounds utilized in the present invention may be utilized in these systems without adversely affecting rheological characteristics or otherwise decreasing the effectiveness of the biopolymer.

A preferred process for introducing metallic compounds of the present invention into a subterranean well consists of adding a predetermined quantity of the metallic compound to the drilling fluid and circulating the fluid in the well bore. This process utilizes a metallic complex which is obtained by the reaction of the preferred zinc compound with known organic dispersants in order to provide enhanced hydrogen sulfide scavenging throughout the drilling fluid system. These dispersing materials will generally include in their structure an aromatic ring to which are attached methoxyl and hydroxyl groups, along with a possible alkyl side group. Lignin-containing polymers are particularly useful. Lignin-containing materials are readily available as cellulose by-products of the pulp and paper industry. In general, any type of wood or cellulosic material which can be resolved into wood pulp will be a satisfactory source of lignin-containing materials. Although further purification and concentration will usually be preferred, the lignin-containing by-products of wood pulp processes may be used in crude or purified form with the zinc compounds of the present invention. For example, modified lignosulfonic acid metal salts, including degraded, condensed, or polymerized ligno-materials may be utilized. Various lignosulfonates of light or heavy metals, such as chromium, aluminum, iron, zirconium, sodium, potassium, calcium, and ammonium salts may also be utilized.

Kraft lignin from the sulfate pulping process, as well as soda lignin from the soda pulping process, both being in the form of unsulfonated lignin salts may also be utilized. In addition, tannin materials such as bark extracts, quebracho wood, and wattle extracts may also be utilized for this purpose. In our examples we have utilized a desugared polymerized sodium lignosulfonate which is reacted with basic zinc carbonate. This material contains approximately 24.6% lignosulfonate, 1.5% sodium hydroxide, and 73.8% basic zinc carbonate. This material is utilized for the purposes of illustration only. As stated earlier, our process is not dependent upon the use of the metal compounds with any particular dispersant, the use of such dispersant being entirely optional and utilized for increasing the surface area of the metal compound and colloidally dispersing it throughout the drilling fluid system. The metallic compounds utilized in our process have been found to function with completely satisfactory results with or without the use of a dispersant.

The metal compounds utilized in the present invention may be introduced into the drilling fluid in a variety of convenient manners. For example, the material may be slowly added to the drilling fluid at the mud hopper for subsequent circulation throughout the well. Additional amounts of the metallic compounds may be added as needed. In order to properly protect against corrosion by hydrogen sulfide contamination in the drilling fluid system, the scavenging material should preferably be added to the drilling fluid before initial circulation is begun. However, this method of introducing the metallic compounds utilized in the present invention is not mandatory. Equally effective is the introduction of the material into a drilling fluid which has already been exposed to hydrogen sulfide contamination.

In the Examples, all metal compounds utilized are easily obtained. Although zinc carbonate, $ZnCO_3$, and zinc hydroxide, $Zn(OH)_2$, are not commercially available, their preparation may be easily and economically achieved by a variety of methods which are readily available and known to those skilled in the art. For example, the method utilized in Example I will provide a zinc hydroxide compound well suited for the purposes of the present invention. Basic zinc carbonate, $ZnCO_3 \cdot Zn(OH)_2$, is, however, readily available as a commercial technical grade material and is readily available for purchase by the general public.

The present invention may be more fully understood from a reading of the Examples which follow.

EXAMPLE I

The present example demonstrates a method for the preparation of zinc hydroxide utilized in the examples below. 16.1 grams of $ZnSO_4 \cdot 7H_2O$ were dissolved in 150 ml of water. A solution of 8 grams of sodium hydroxide in 50 ml of water was added to the zinc sulfate solution. The zinc hydroxide produced was filtered from the solution and washed with distilled water and dried at room temperature. Ten grams of zinc hydroxide were recovered utilizing this method.

EXAMPLE II

A dispersed composition containing the hydrogen sulfide scavenger was prepared containing the following:

| | |
|---|---|
| Lignosulfonate solution 29.0 weight % solids | 338.0 g |
| Deionized water | 317.0 g |
| Sodium hydroxide solution 50 weight % solids | 12.0 g |
| Basic zinc carbonate | 290.0 g |

The lignosulfonate solution was diluted with deionized water in order to provide a 15.0 weight percent lignosulfonate solids solution. This solution was heated to approximately 55°C. Sodium hydroxide solution was added in order to adjust the pH to 7.0. Basic zinc carbonate was slowly added to the neutralized solution. The solution was thoroughly agitated until all of the basic zinc carbonate was in solution. The composition was then spray dried.

EXAMPLE III

The following example demonstrates the ability of metallic compounds utilized in the present invention to effectively remove soluble sulfide found in hydrogen sulfide contaminated aqueous drilling fluids. The test utilized is a standard one for the industry and is further explained in *Standard Methods for the Examination of Water and Waste Water*, American Public Health Association, New York, New York, 12th Ed., 1965, pp. 427–428. A 30 barrel equivalent quantity of the following drilling fluid was utilized having the following components:

| | |
|---|---|
| 7,760 ml water | |
| 600 g Milgel[1] | |
| 260 g Panther Creek[2] Clay | |
| 272 g Ball Clay | |
| 7,500 g Mil-Bar[3] | |
| 180 g Uni-Cal[4] | |

[1]Trademark for a premium grade Wyoming bentonite sold by Milchem Incorporated.
[2]Brand of calcium bentonite sold by American Cyanamid.
[3]Trademark for a high purity barite weighting agent sold by Milchem Incorporated.
[4]Trademark for a lignin-derived polymeric composition sold by Milchem Incorporated.

The pH of this mud sample was adjusted to approximately 11 with additional amounts of sodium hydroxide. The sample was stirred with a paddle-type stirrer. Hydrogen sulfide from a tank was bubbled through the mud sample with a fritted-glass dispersion tube until the pH dropped to approximately 8. This process was repeated on the sample four times, resulting in 1½ kg batches of mud containing approximately 1120 ppm (parts per million) average soluble sulfide ion.

The hydrogen sulfide contaminated mud sample was split into five 100 gram portions. The first sample was not treated with a hydrogen sulfide scavenging material. The second sample was treated with basic copper carbonate, while the third, fourth, and fifth samples were treated with basic zinc carbonate, zinc carbonate, and zinc hydroxide, respectively. A quantity of each metal complex was used such that 1.00 gram of metal was present in the treated samples. Each sample was shaken mechanically with a "wrist action" Burrell shaker for ½ hour. The pH of each sample was measured before filtration through a Fann filter press. The filtrate from each treated sample containing soluble sulfide was collected and analyzed for sulfide content and compared with the sulfide in the sample which was untreated. The results of these tests are further shown in Table 3. In this Example and in Examples IV, V, VI, VII, and VIII, the analytical procedure utilized for measuring sulfide content has an accuracy factor of ± 30 ppm. Results should be interpreted with this in mind, especially in instances where the ppm level of sulfide is reported to be in the area of 30 ppm.

TABLE 3

| Compound | pH/sample | Approximate Average Soluble Sulfide Before Treatment,ppm | Approximate Average Soluble Sulfide After Treatment,ppm |
|---|---|---|---|
| Base mud | 9.3 | 1120 | 1120 |
| Basic $CuCO_3$ | 10.5 | 1120 | 50 |
| Basic $ZnCO_3$ | 10.6 | 1120 | 40 |
| $ZnCO_3$ | 11.1 | 1120 | 40 |
| $Zn(OH)_2$ | 9.90 | 1120 | 150 |

EXAMPLE IV

Tests were run and results were evaluated as in Example III with the exception that each sample of treated mud contained a metal content of 0.500 grams per 100 grams of hydrogen sulfide contaminated mud. These tests indicated that hydrogen sulfide can be effectively reduced to below minimum tolerable levels by use of a scavenging material having this metal content. The results of this test are further indicated in the following table.

TABLE 4

| Compound | pH/sample | Approximate Average Soluble Sulfide Before Treatment,ppm | Approximate Average Soluble Sulfide After Treatment,ppm |
|---|---|---|---|
| Base mud | 9.21 | 910 | 910 |
| Basic $CuCO_3$ | 10.4 | 910 | 50 |
| Basic $ZnCO_3$ | 10.6 | 910 | 40 |
| $ZnCO_3$ | 10.7 | 910 | 70 |
| $Zn(OH)_2$ | 9.21 | 910 | 180 |

EXAMPLE V

Tests were run and results were evaluated, as in Examples III and IV, with the exception that each sample of treated mud contained a metal content of 2.00 gram per 100 grams of hydrogen sulfide contaminated mud. Again, the hydrogen sulfide was removed to below minimum tolerable levels. The results of this test are indicated in the following table.

TABLE 5

| Compound | pH/sample | Approximate Average Soluble Sulfide Before Treatment,ppm | Approximate Average Soluble Sulfide After Treatment,ppm |
|---|---|---|---|
| Base mud | 9.3 | 1080 | 1080 |
| Basic $CuCO_3$ | 10.4 | 1080 | 50 |
| Basic $ZnCO_3$ | 10.6 | 1080 | 40 |
| $ZnCO_3$ | 10.7 | 1080 | 70 |
| $Zn(OH)_2$ | 10.0 | 1080 | 57 |

EXAMPLE VI

Tests were run and results were evaluated to determine the effect of the scavenger utilized in the present invention to effectively function in aqueous drilling fluids when the pH of 12.0 or higher. Ph's in this area are frequently encountered, especially in situations where hydrogen sulfide is present or is suspected. In many instances, metal compounds will react with alkaline materials to form a soluble substance which will lose effective scavenging ability. In the case of zinc, this substance is commonly referred to as "zincate." To test the effect of high alkalinity on soluble sulfide removal, a base mud was treated with hydrogen sulfide as in the previous examples. Sodium hydroxide was added until the "P"alkalinity of the filtrate was 0.233 meq/ml (35.0 ml N/50 $H_2SO_4$). Again 100 gram aliquots of mud were treated with metal complexes equivalent to 2.00 grams of metal. These were shaken ½ hour, filtered and the filtrate analyzed for soluble sulfide content. The results of this test indicated that zincate was not formed in the drilling fluid and that the metal compounds effectively scavenged hydrogen sulfide.

TABLE 6

| Compound | pH/sample | Approximate Average Soluble Sulfide Before Treatment,ppm | Approximate Average Soluble Sulfide After Treatment,ppm |
|---|---|---|---|
| Base mud | 12.7 | 3000 | 3000 |
| Basic $CuCO_3$ | 12.6 | 3000 | 30 |
| Basic $ZnCO_3$ | 12.5 | 3000 | 60 |
| $Zn(OH)_2$ | 12.5 | 3000 | 10 |

EXAMPLE VII

Tests were conducted and results were evaluated to determine the effect of aging mud samples containing metal compounds for the removal of hydrogen sulfide. A base mud was prepared as in the previous examples and was treated with basic copper carbonate, basic zinc carbonate, zinc hydroxide, and zinc carbonate containing the equivalent of 2.00 grams of metal per 100 grams of mud. These samples were shaken 3½ days and were filtered. The filtrate was then analyzed for soluble sulfide content. The results of this test indicated that the metal compounds of the present invention effectively removed sulfide after aging over long periods. The results of this test are further shown in the following table.

TABLE 7

| Compound | Approximate Average Soluble Sulfide Before Treatment,ppm | Approximate Average Soluble Sulfide After Treatment,ppm |
|---|---|---|
| Base mud | 2000 | 2000 |
| Basic $CuCO_3$ | 2000 | 0 |
| Basic $ZnCO_3$ | 2000 | 30 |
| $ZnCO_3$ | 2000 | 30 |
| $Zn(OH)_2$ | 2000 | 60 |

EXAMPLE VIII

Tests were run and results were evaluated to determine the completeness of reaction of scavenging compounds. A test mud was prepared as in the previous examples. Three sample portions of 100 grams each were utilized in the test. One portion was untreated. The remaining two portions were treated with basic zinc carbonate, and zinc hydroxide, respectively. Amounts of the metal compound were added so that they would be equal mole-wise to the amount of total sulfide present (4.25 millimoles). The samples was then "hot rolled" at 150°F for 8 hours. The samples were then filtered and the filtrate analyzed for soluble sulfide content. The results of this test indicated that the metal compounds utilized in the present invention effectively removed soluble sulfide when utilized in near stoichiometric ratios. The results of this test are further shown in the table below.

TABLE 8

| Compound | pH of mud | Approximate Average Soluble Sulfide Before Treatment,ppm | Approximate Average Soluble Sulfide After Treatment,ppm |
|---|---|---|---|
| Basic mud | 9.5 | 2230 | 2230 |
| Basic $ZnCO_3$ | 10.0 | 2230 | 140 |
| $Zn(OH)_2$ | 10.3 | 2230 | 60 |

EXAMPLE IX

The present example demonstrates the tendency of a metal compound containing a metal below that of iron in the electromotive series table to corrode iron surfaces. Sufficient $CuSO_4 \cdot 5H_2O$ was reacted with sodium lignosulfonate filtrate to obtain a final product ratio of 50 weight percent of $CuSO_4 \cdot 5H_2O$ to an equal weight percent sodium lignosulfonate filtrate. The cupric sulfate was converted to cupric hydroxide by the addition of sodium hydroxide and the product was then spray dried. This sample was compared with a sample containing an aqueous mixture of 1.0 weight percent basic cupric carbonate and a sample containing an aqueous mixture of 1.0 weight percent cupric sulfate. All samples were adjusted to pH 9.0 by the addition of sufficient quantities of sodium hydroxide. The samples were placed in glass containers containing 5 cm. × 2.5 cm. × 0.01 cm. 1020 mild steel coupons and were shaken at 25°C. for 22 hours utilizing "wrist action" mechanical shakers. The coupons were then removed, water washed and air dried. The above experiment was repeated, duplicate samples being hot rolled at 150°F. for 18 hours. X-ray diffraction analyses indicated the presence of copper metal on each coupon from each sample.

Copper sulfide precipitated by the use of copper containing scavengers having a finite solubility product was also proven to subject ferrous metal to copper plating. Fifteen ppg lignosulfonate and was prepared as in Example III at a pH of 8.5. To separate samples were added cupric sulfide and cuprous sulfide, respectively. The samples were hot rolled in contact with the above described steel coupons for 17 hours at 150°F. The resulting coupons visually appeared to be copper plated. The experiment was repeated, hot rolling the samples in contact with steel coupons for 72 hours at 150°F. After the coupons were water washed and air dried, X-ray emission spectrographic techniques showed the presence of elemental copper on the coupons taken from both the cuprous sulfide- and cupric sulfide-containing samples.

To demonstrate that the copper detected on the steel coupons was plated copper, an irreversible cell with 1.0 N potassium chloride as the electrolyte was constructed. Steel coupons from the previous tests which were subjected to cupric and cuprous sulfide were used as one electrode of the cell. Untreated steel coupons were set at the other electrode. The electromotive force produced was measured with a standard volt meter. Prior to measurement the coupons were cleaned with an ultrasonic bath, eliminating the possibility of an electrical potential being produced due to particles not bonded to the metal. The results of these tests indicated the existence of copper plating, and are further illustrated in the following table.

TABLE 9

| Cell | emf, Volts |
|---|---|
| Steel, vs. steel | .003* |
| Steel, vs. steel subjected to mud system 17 hours at 150°F. | .001 |
| Steel, vs. copper (Copperwire) | .3 |
| Steel, vs. steel subjected to $Cu_2S$ in mud system 72 hours at 150°F. | .1 |
| Steel, vs. steel subjected to CuS in mud system 72 hours at 150°F. | .03 |

*Average of replicate determinations

EXAMPLE X

Tests were run and results were evaluated to determine the plating tendency of zinc metal from zinc compounds on ferrous metal in an aqueous drilling fluid system. A 15 ppg weighted mud was prepared as in Example III. The pH of this mud was adjusted to 8.5 with sodium hydroxide. To 200 cc samples of the mud were added 2.0 grams of basic zinc carbonate and 2.0 grams of the zinc carbonate-lignosulfonate preparation as made in Example II. The samples were placed in glass containers and a 5 cm. × 2.5 cm. × 0.01 cm. 1020 mild steel coupon was added to each. The samples were hot rolled at 150°F. for 88 hours. The resulting coupons were water washed and air dried. The presence of zinc metal on the coupons could not be detected by X-ray diffraction techniques. To ascertain if zinc was present on the coupons in electrical continuity with the ferrous metal, (i.e., zinc plating), an irreversible cell with 0.1 N potassium chloride as the electrolyte was constructed. The steel coupons previously treated with basic zinc carbonate and the zinc carbonate-lignosulfonate material, were used as one electrode of the cell, respectively, while the unused coupons were set as the other electrode. The electromotive force produced was measured with a standard voltmeter. Prior to measurement, the coupons were cleaned with an ultrasonic bath eliminating the possibility of an electrical potential being produced due to particles not bonded to the metal. The results of this test indicated that no detectable electromotive force could be produced between the treated coupons and unused steel coupons. The results of this test are further illustrated in the following table.

TABLE 10

| Cell | emf, Volts |
| --- | --- |
| Steel vs. steel | .002 |
| Steel vs. zinc metal | .15 |
| Steel vs. steel subjected to basic zinc carbonate | .001 |
| Steel vs. steel subjected to zinc carbonate-lignosulfonate | .001 |

EXAMPLE XI

The present example demonstrates the elimination of metal fatigue caused by metallic corrosion, when the metallic compounds of the present invention are utilized. The fatigue tests were made utilizing a Conoco Flex Tester, an instrument which applies stress to a metal surface coupon sample. This instrument determines the amount of metal fatigue of a surface by applying stress to the sample. The more stress that can be applied to a sample over a period of time without causing the sample to crack or otherwise separate, the more durable the sample and the less susceptibility of the sample to corrosion. The stress is applied by blending or "flexing" the coupon from center to left to right and back to center in cycles of approximately 720 per minute. "Failure" is defined as the amount of time required to break a coupon by applying pressure and force in this manner. A sample mud was prepared containing 15 ppb Milgel[1], 2.0 ppb carboxymethylcellulose, 6.0 ppb Uni-Cal[2] and 1.0 ppb sodium chloride. The pH of this sample was adjusted to 9.0. The sample mud was split into three portions. The first portion was not treated in order to serve as a base. The second portion was treated with 1.5 ppb of copper carbonate while the third portion was treated with 2.0 ppb of the basic zinc carbonate-lignosulfonate material made as in Example II. The fatigue tests were made at 150°F. by exposing mild steel coupons to the respective samples in the Conoco Flex Tester at 150°F. and applying a stress of $3.16 \times 10^4$ psi to each test specimen. The results of this test indicated that copper carbonate reduced the fatigue life of the coupon in the treated fluid by about two-thirds of the base mud level, while the basic zinc carbonate-lignosulfonate sample showed no effect on the fatigue life of the coupons. The average number of hours to failure for the base mud was 51.9 compared with 18.5 hours for the copper carbonate-treated sample and 51.1 hours for the basic zinc carbonate-lignosulfonate-treated sample. Examination of the test specimens exposed to the base mud revealed some shallow pits under solids deposits. The specimens from the copper carbonate-treated sample revealed shallow pits under sodium deposits. Furthermore, these coupons revealed extensive copper plating on the surface with deep pits and fatigue cracks under solids deposits. Numerous transverse fatigue cracks were located near the edges of the coupons. These coupons were broken nearer to the neck, indicating a higher corrosion rate. However, the coupons exposed to the basic zinc carbonate-lignosulfonate-treated sample were quite similar in appearance to the base mud; there were a few shallow pits, but no deep pits and no transverse fatigue cracks. The results of these tests are further illustrated in the following table.

[1]Trademark for a premium grade Wyoming bentonite sold by Milchem Incorporated.
[2]Trademark for a lignin-derived polymeric composition sold by a Milchem Incorporated.

TABLE 11

| Sample | Time to Failure (hrs.) | Number of Flex Cycles to Failure |
| --- | --- | --- |
| Base Mud | 45.7 | $2.03 \times 10^6$ |
| D. O.* | 53.6 | $2.38 \times 10^6$ |
| D. O. | 56.4 | $2.51 \times 10^6$ |
| Base + 1.5 ppb $CuCO_3$ | 18.0 | $8.02 \times 10^5$ |
| D. O. | 20.5 | $9.12 \times 10^5$ |
| D. O. | 17.0 | $7.57 \times 10^5$ |
| Base + 2.0 ppb basic zinc carbonate-lignosulfonate | 39.3 | $1.74 \times 10^6$ |
| D. O. | 56.0 | $2.48 \times 10^6$ |
| D. O. | 58.1 | $2.58 \times 10^6$ |

*Done Over

EXAMPLE XII

Tests were run and results were evaluated to determine the effect of metal compounds of the present invention on the rheology of drilling fluids containing a polysaccharide material as the viscosifier rather than a clayey material. The polysaccharide material utilized is the product produced by the action of bacteria of the genus Xanthomonas on a carbohydrate and is commercially available as "Kelzan XC Polymer", made by the Kelco Corporation, San Diego, California. The polysaccharide material was mixed with 100 ppb calcium contaminated water to provide a 1 ppb polysaccharide solution. This material was cross-linked with 4 ppb of "OCP-7", a polysaccharide cross-linking drilling fluid additive made by and commercially available from Milchem, Incorporated, Houston, Texas. The Ph of this solution was adjusted to 9.0 with sufficient incremental additions of sodium hydroxide.

Another polysaccharide solutions was prepared and was cross-linked with 0.25 ppb of chrome alum, a common polysaccharide cross-linking agent. The pH of this sample was again adjusted to 9.0.

Each sample was aged overnight at 150°F. and was allowed to cool to room temperature. To a portion of each sample was added 3 ppb of the zinc carbonate-lignosulfonate material as prepared in Example II. Rheological properties of the four samples were obtained using a Model 35 Fann Viscometer, a common instrument for measuring rheological properties of liquid and widely accepted by many industries where rheological data is relevant. Fann viscometers are of the concentric cylinder type where the test fluid is contained in an annular space between cylinders. Rotation of the outer cylinder at known velocities is accomplished through precision gearing causing a torque to be transmitted to the inner cylinder by the viscous dray of the fluid. This torque is balanced by a helical spring, and annular deflection is read from a dial or through suitable sensors on a meter or recorder. The amount of torque at a given rpm is indicated in arbitrary degrees Fann, which may be converted into viscosity or apparent viscosity by appropriate calculation. The tests were initiated before and after additional overnight aging. The results of the tests indicated that the addition of basic zinc carbonate to the polymer system will not adversely affect rheological properties. It is of particular importance to note that API filtrate was reduced considerably by the addition of the hydrogen sulfide scavenging material utilized in the present invention. The following tables further illustrate the results of these tests.

TABLE 12

| | BEFORE AGING | | | |
|---|---|---|---|---|
| | Cross-Linking Agent | | | |
| | "OCP-7" | | CHROME ALUM | |
| | no treatment | zinc treatment | no treatment | zinc treatment |
| Fann, rpm | | | | |
| 600 | 37 | 31 | 46 | 38 |
| 300 | 27 | 22 | 31 | 26 |
| 200 | 22 | 18 | 25 | 21 |
| 100 | 11 | 14 | 18 | 15 |
| 6 | 6 | 5 | 6 | 5 |
| 3 | 5 | 4 | 5 | 4 |
| Initial Gel | 6 | 5 | 6 | 5 |
| 10 min. Gel | 13 | 10 | 8 | 8 |
| API Filtrate | 200.0 | 17.4 | 40.0 | 25.0 |

| | AFTER AGING | | | |
|---|---|---|---|---|
| | Cross-Linking Agent | | | |
| | "OCP-7" | | CHROME ALUM | |
| | no treatment | zinc treatment | no treatment | zinc treatment |
| Fann, rpm | | | | |
| 600 | 32 | 30 | 34 | 28 |
| 300 | 23 | 22 | 23 | 19 |
| 200 | 19 | 17 | 18 | 15 |
| 100 | 14 | 13 | 12 | 10 |
| 6 | 5 | 4 | 3 | 3 |
| 3 | 4 | 3.5 | 3 | 2.5 |
| Initial Gel | 4 | 4 | 3 | 3 |
| 10 Min. Gel | 8 | 7 | 3.5 | 4 |
| API Filtrate | 150.0 | 18.0 | 40.0 | 29.0 |

EXAMPLE XIII

Tests were run and results were evaluated to determine the effect of metal compounds utilized in the present invention on the rheological properties of a laboratory prepared drilling mud. A 14.2 ppg fresh water lignosulfonate mud was prepared and contained the following:

```
25 ppb bentonite
15 ppb Panther Creek bentonite
 6 ppb Uni-Cal¹
 1 ppb NaCl
```

[1]Trademark for a lignin-derived polymeric composition sold by Milchem Incorporated.

The pH of this mud was adjusted to 9–9.5. This mud was aged overnight at 150°F. and allowed to cool to room temperature. Flow properties were taken using a Model 35 Fann Viscometer as above described after the sample was stirred for 15 minutes on a Hamilton Beach mixer at low speed. To two 350 ml. samples, 2 and 4 ppb Baker analytical grade zinc carbonate was added. The zinc carbonate was mixed with the mud and the rheology and API filtrate were measured. The samples were then aged cooled, and and mixed as before. The rheology and API filtrate were again measured. The results of this test indicated that zinc carbonate did not adversely affect the viscosity or filtrate of the test mud. The results of these tests are further illustrated in the following table:

TABLE 13

| | BEFORE AGING | | |
|---|---|---|---|
| Fann, rpm | no treatment | 2.0 ppb ZnCO₃ | 4.0 ppb ZnCO₃ |
| 600 | 96 | 114 | 112 |
| 300 | 54 | 67 | 66 |
| 200 | 40 | 49 | 49 |
| 100 | 23 | 30 | 30 |
| 6 | 4 | 9 | 9 |
| 3 | 3 | 8 | 8 |
| API Filtrate | 9.6 ml | 9.6 ml | 9.4 ml |

TABLE 13-continued

| | AFTER AGING | | |
|---|---|---|---|
| Fann, rpm | no treatment | 2.0 ppb ZnCO₃ | 4.0 ppb ZnCO₃ |
| 600 | 125 | 127 | 130 |
| 300 | 72 | 74 | 76 |
| 200 | 51 | 55 | 57 |
| 100 | 30 | 34 | 35 |
| 6 | 5 | 11 | 12 |
| 3 | 4 | 10 | 12 |
| API Filtrate | 8.5 ml | 8.8 ml | 9.0 ml |

EXAMPLE XIV

Tests were run and results were evaluated in order to determine the effect of the addition of basic zinc carbonate on the rheological properties of a laboratory prepared fresh water lignosulfonate mud. Two, 3 and 6 ppb equivalents of a 10 ppg lignosulfonate mud consisting of 21.5 ppb Milgel¹, 3 ppg Uni-Cal², and 1.0 ppb NaCl were prepared. The pH was adjusted to 9.5. Rheological properties were determined as in the above examples. The results of these tests indicated that the use of basic zinc carbonate in a lignosulfonate mud will not have adverse effects on the rheological properties of the mud. The results of these tests are further illustrated in the table below.

[1]Trademark for a premium grade Wyoming bentonite sold by Milchem Incorporated.
[2]Trademark for a high purity barite weighting agent sold by Milchem Incorporated.

TABLE 14

| | BEFORE AGING | | | |
|---|---|---|---|---|
| Fann, rpm | no treatment | 2 ppb Zinc Material | 3 ppb Zinc Material | 6 ppb Zinc Material |
| 600 | 48 | 49 | 49 | 53 |
| 300 | 27 | 27 | 27 | 31 |
| 200 | 20 | 19 | 20 | 22 |
| 100 | 12 | 12 | 12 | 14 |
| 6 | 4 | 4 | 5 | 6 |
| 3 | 4 | 4 | 5 | 6 |

| | AFTER AGING | | | |
|---|---|---|---|---|
| Fann, rpm | no treatment | 2 ppb Zinc Material | 3 ppb Zinc Material | 6 ppb Zinc Material |
| 600 | 49 | 51 | 55 | 56 |
| 300 | 25 | 27 | 29 | 30 |
| 200 | 17 | 19 | 21 | 21 |
| 100 | 9 | 10 | 11 | 11 |
| 6 | 1 | 2 | 2 | 2 |
| 3 | 1 | 1 | 1 | 2 |

EXAMPLE XV

The present invention illustrates the scavenging effects of a metallic compound prepared in situ in a drilling fluid system. A base mud was prepared as in Example III. The pH of the mud was adjusted to pH 11.0 with a sufficient amount of sodium hydroxide. To this mud was added 0.5 liters of hydrogen sulfide gas to provide 700 ppm sulfide in the sample. One ppb of zinc sulfate was added to the sample to react with the sodium hydroxide to form zinc hydroxide for scavenging the hydrogen sulfide. The filtrate of this sample was obtained and the amount of sulfide after treatment was effectively and safely reduced to 200 ppm.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosures. Accordingly, modifications are contemplated which can be made without departing from the spirit of the described invention.

What we claim and desire to be granted by Letters Patent is:

1. In the process of preventing corrosion of metallic subterranean well drilling apparatuses exposed to an aqueous alkaline drilling fluid having a pH at least as high as about 9.0 and contaminated by hydrogen sulfide, the step of removing hydrogen sulfide from said fluid with a hydrogen sulfide scavenger consisting essentially of basic zinc carbonate, said scavenger being added to said drilling fluid in an amount of at least about 1 p.p.b.

2. In the process of treating an aqueous alkaline drilling fluid having a pH at least as high as about 9.0 for removal of hydrogen sulfide encountered during the drilling of subterranean wells, the steps of admixing with said drilling fluid a hydrogen sulfide scavenger consisting essentially of basic zinc carbonate to react with said hydrogen sulfide forming a metallic sulfide, and circulating said fluid in well bore, said scavenger being added to said drilling fluid in an amount of at least about 1 p.p.b.

3. A process of preventing undesirable effects of hydrogen sulfide which has been encountered by an aqueous drilling fluid which is circulated at a pH at least as high as about 9.0 in a subterranean well during the drilling thereof with metallic drilling apparatus, wherein said hydrogen sulfide contaminates said drilling fluid resulting in undesirable property changes in said drilling fluid, and wherein said hydrogen sulfide contaminated drilling fluid is corrosive to said drilling apparatus, said process comprising the steps of: adding to said drilling fluid basic zinc carbonate in an amount of at least about 1 p.p.b whereby said hydrogen sulfide contamination is scavenged and reacted to form insoluble zinc sulfide as a reaction product, and circulating said decontaminated drilling fluid in said well, whereby said addition of said basic zinc carbonate and also the formation of said hydrogen sulfide reaction product do not adversely affect the rheological properties of said drilling fluid, said hydrogen sulfide contamination is scavenged to prevent said hydrogen sulfide from adversely affecting the rheological properties of said drilling fluid, and whereby corrosion of said apparatus is prevented.

4. A process of preventing undesirable effects of hydrogen sulfide upon an aqueous drilling fluid which has been exposed to and has become contaminated with hydrogen sulfide and which is circulated at a pH at least as high as about 9.0 in a subterranean well during the drilling thereof with metallic drilling apparatus, wherein said hydrogen sulfide causes undesirable property changes in said drilling fluid, and wherein said hydrogen sulfide contaminated drilling fluid is corrosive to said drilling apparatus said process comprising the steps of: adding to said contaminated drilling fluid basic zinc carbonate in an amount of at least about 1 p.p.b. whereby said hydrogen sulfide contamination is scavenged and is reacted to form insoluble zinc sulfide as a reaction product, and circulating said decontaminated drilling fluid in said well, whereby said addition of said basic zinc carbonate and also the formation of said hydrogen sulfide reaction product do not adversely affect the rheological properties of said drilling fluid, said hydrogen sulfide contamination is scavenged to prevent said hydrogen sulfide from adversely affecting the rheological properties of said drilling fluid and whereby corrosion of said apparatus is prevented.

* * * * *